June 2, 1970   W. H. LOVE ET AL   3,515,529
GLASS MELTING FURNACE AND METHOD OF OPERATION
Filed June 8, 1967   5 Sheets-Sheet 1

INVENTORS
WILLIAM HAROLD LOVE &
BY EUSTACE HAROLD MUMFORD

D. T. Innis &
W. P. Schaich
ATTORNEYS

June 2, 1970 W. H. LOVE ET AL 3,515,529
GLASS MELTING FURNACE AND METHOD OF OPERATION
Filed June 8, 1967 5 Sheets-Sheet 2
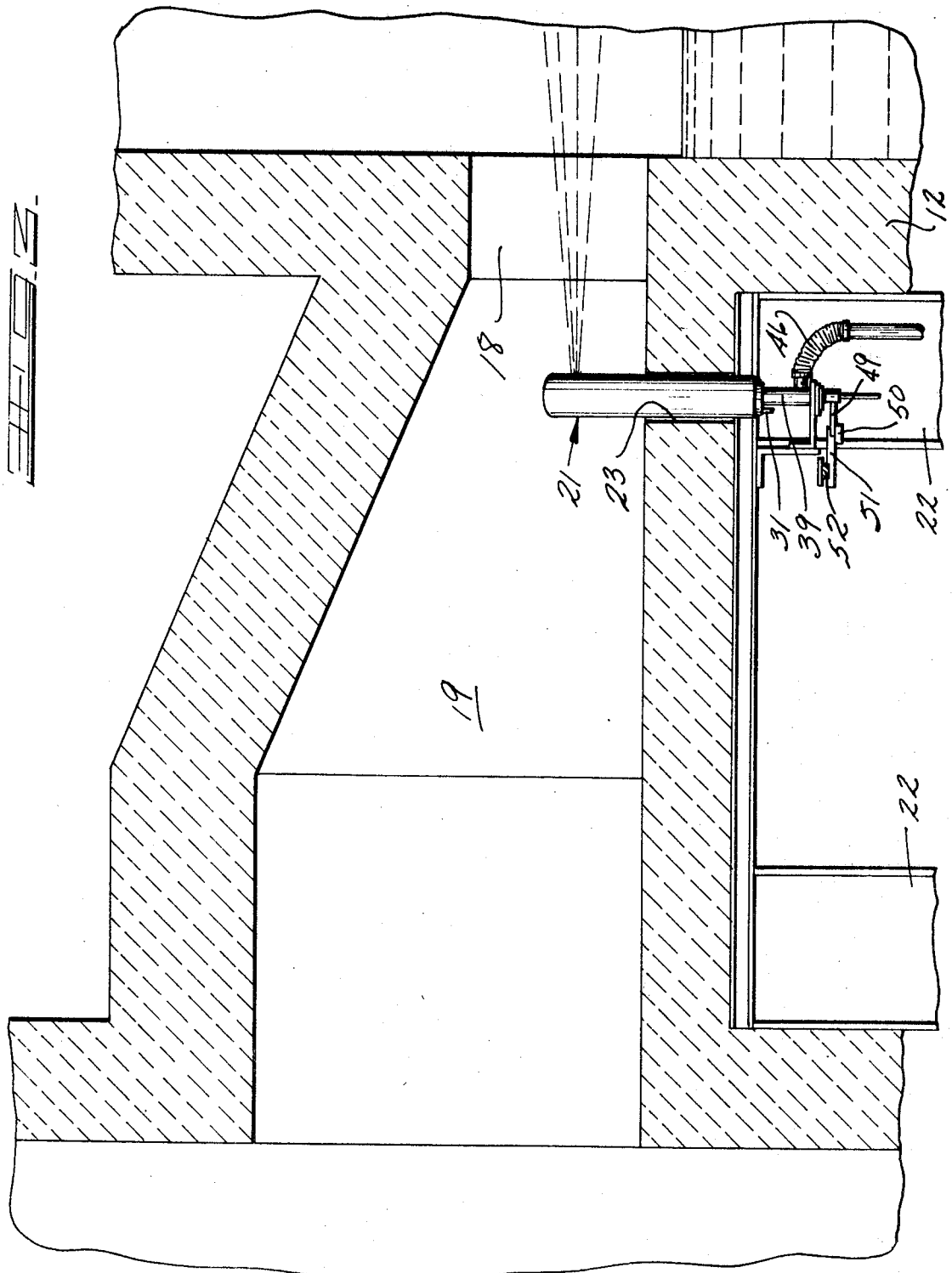
INVENTORS
WILLIAM HAROLD LOVE &
BY EUSTACE HAROLD MUMFORD
D. T. Innis &
W. A. Schaich
ATTORNEYS

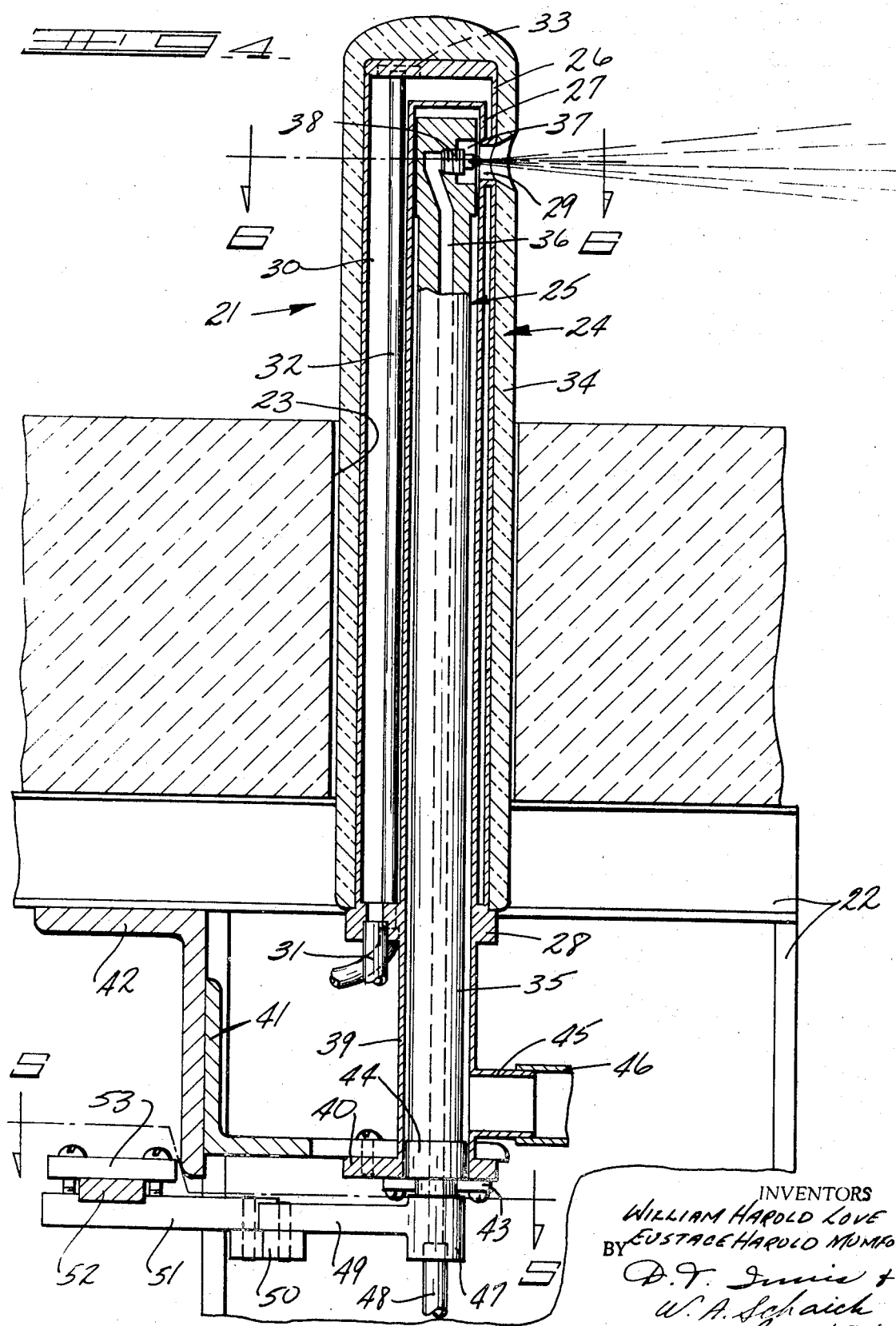

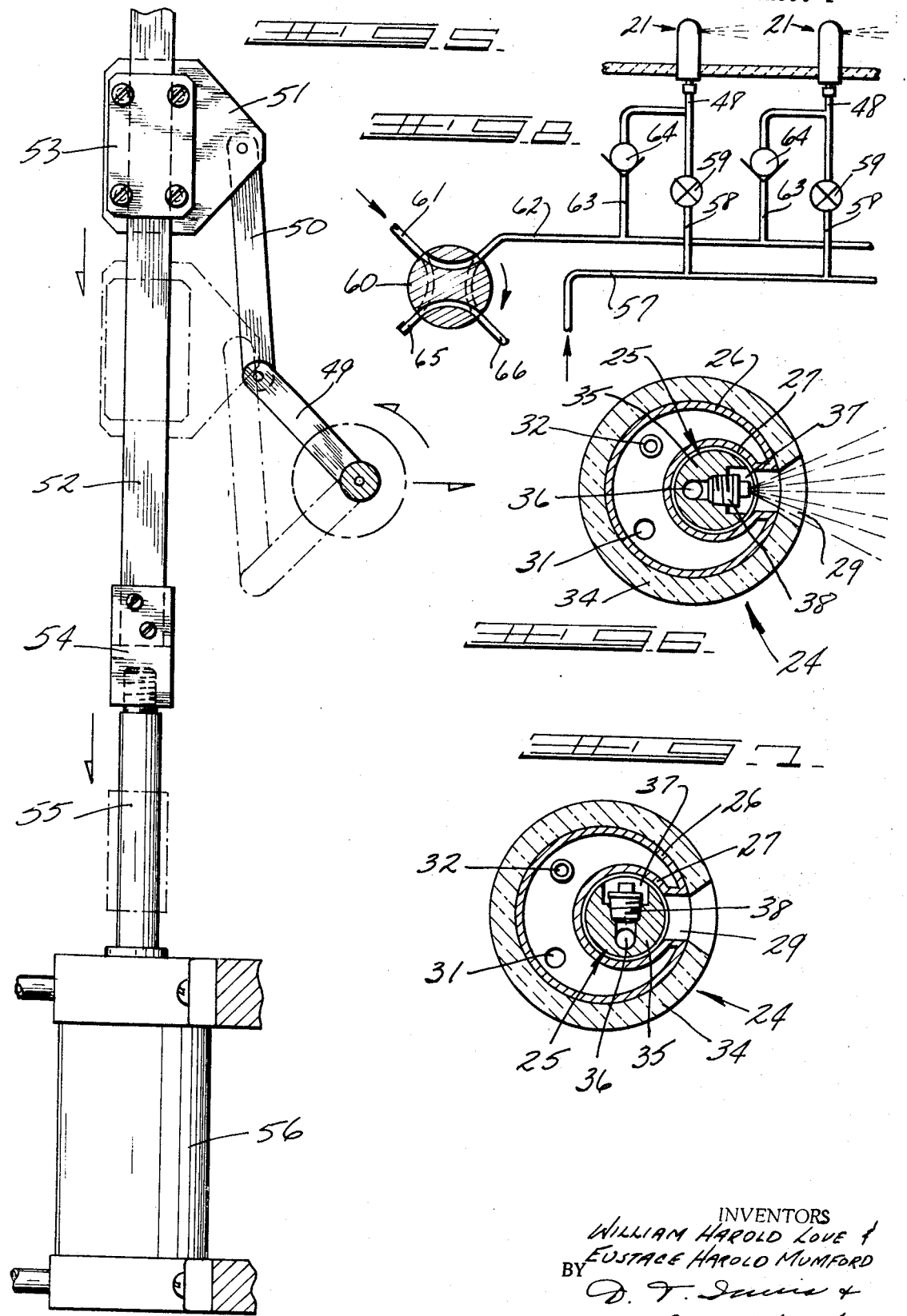

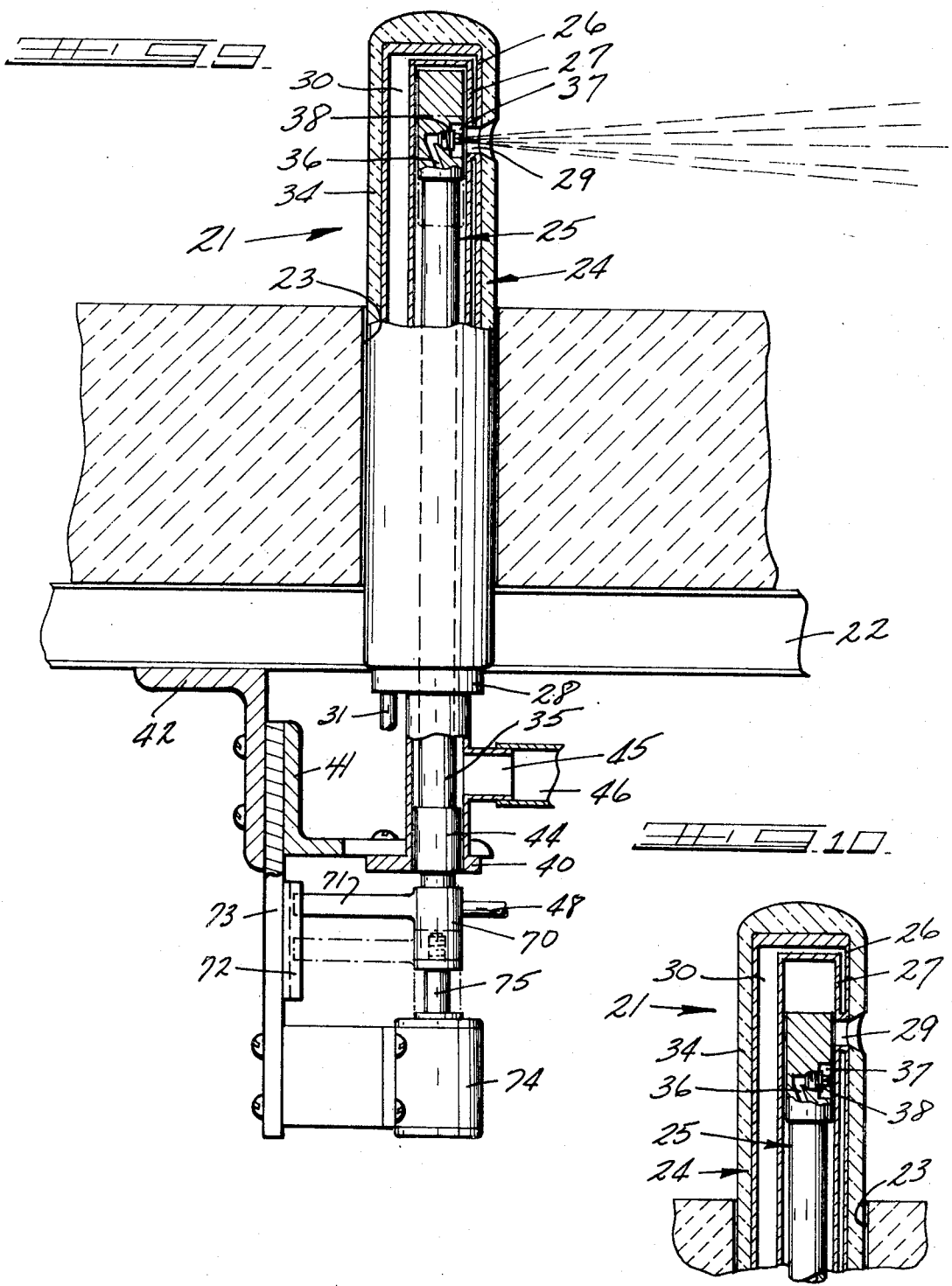

United States Patent Office 3,515,529
Patented June 2, 1970

3,515,529
GLASS MELTING FURNACE AND
METHOD OF OPERATION
William Harold Love, Toledo, Ohio, and Eustace Harold
Mumford, Ottawa Lake, Mich., assignors to Owens-Illinois, Inc., a corporation of Ohio
Filed June 8, 1967, Ser. No. 644,626
Int. Cl. C03b 5/16, 5/24
U.S. Cl. 65—27                    11 Claims

ABSTRACT OF THE DISCLOSURE

A regenerative type glass melting furnace in which a combustible fuel is introduced through side wall ports opening into the furnace space above the glass level within the furnace. A fuel burner placed in each port is supplied with a fluid fuel under pressure, particularly fuel oil, without the introduction of air under pressure as an atomizing means. The fuel is sprayed into the region overlying the molten glass and batch to be melted. The burners along one side of the furnace are all fired at the same time, while the burners on the opposed side of the furnace are shielded by rotation of the fuel spray nozzle through an angle of approximately 90°, to thus protect the non-firing burner nozzles from becoming clogged with the combustion products produced by the opposed set of burners. Intrusion of gases into the non-firing burners is also prevented by the introduction of air under slightly elevated pressure and the burners themselves, after firing, are purged of fuel oil.

Background of the invention

This invention relates to a method and apparatus for melting batch ingredients into glass by the use of regenerative furnace utilizing fuel oil as the heating medium.

It has been a problem in the past, when utilizing fuel oil as the combustible fuel for firing a glass melting furnace to affect mounting of the burners in such locations as to protect them from the accumulation of fuel soot or other contaminants which would affect their operation. Also, in the use of fuel oil as a combustible mixture it has been the normal practice to atomize and entrain the fuel oil in a high velocity stream of air, thus creating a loss in efficiency due to the fact that the air itself has a cooling effect, particularly in those situations where the mixture is introduced at an elevated pressure and flow velocity.

Another problem encountered in the use of fuel oil as the firing fuel, particularly what is termed "Bunker C" oil, is the tendency for the burner nozzle to "coke" over when not firing and being exposed to heat and flame from the opposed set of firing burners. This "coking," or in some cases total clogging of the spray nozzle, will obviously seriously affect the melting temperatures obtained in the melter. The spray pattern obviously must be maintained at the same configuration at all times in order for a fuel oil firing system to be feasible.

For the foregoing reasons it has been the practice, when operating glass melters, to use natural gas as the combustible fuel rather than fuel oil to any great extent.

From the standpoint of economics, it may be desirable to utilize fuel oil in its liquid state as the fuel for a glass melter in those regions of the world where natural gas is not plentiful. In many instances, even in these situations, it has been found that conversion of the fuel oil into a combustible gas has been utilized because of the greater experience and knowledge in the glass art with respect to the use and operation of gas fired melters as opposed to liquid fuel fired melters.

The present invention is directed to a method and apparatus for utilizing fuel oil in the liquid state as the combustible fuel for a glass melter and to a method of operating a set of burners in such a manner that they will operate reliably for an extended period of time without requiring extensive maintenance.

Summary of the invention

This invention relates to a method and apparatus for operating an oil-fired, reversing type glass melter, wherein a plurality of burners are positioned at spaced intervals along opposed side walls of the melter and oil is fed under pressure to all of the burners on one side of the furnace so that the burners will form an atomized spray of oil, while the burners along the opposite side wall are covered to protect them from the flames and gases issuing from the one side. After a predetermined period of time, the burners on the opposed side are fed with oil under pressure while the burners on the one side have their spray nozzles and the passages leading to the burner nozzles purged of oil by air under pressure and then covered. This purging with air keeps the nozzles clean and prevents seepage due to thermal expansion of oil in the passages leading to the nozzles. A slight pressure drop is maintained across the burner housing openings at all times. Thus the burners which are not being fed with oil are protected from coking or clogging during the firing of the opposed set of burners.

Brief description of the drawings

FIG. 3 is a cross-sectional view taken through one of the burner ports illustrating the position and mounting of a burner therein;

FIG. 4 is a vertical cross-sectional view taken through one of the burners illustrating one embodiment of the invention;

FIG. 5 is a plan view of the linkage means taken at line 5—5 of FIG. 4;

FIG. 6 is a cross-sectional view taken at line 6—6 of FIG. 4;

FIG. 7 is a cross-sectional view, similar to FIG. 6, illustrating the position of the burner nozzle when rotated 90°;

FIG. 8 is a schematic view of the oil and compressed air system connected to the burners;

FIG. 9 is a side elevational view with the burner tip shown in cross-section, illustrating a second embodiment of the invention; and FIG. 10 is a cross-sectional view of the burner tip of FIG. 9, moved to its non-firing position.

Figure 1:
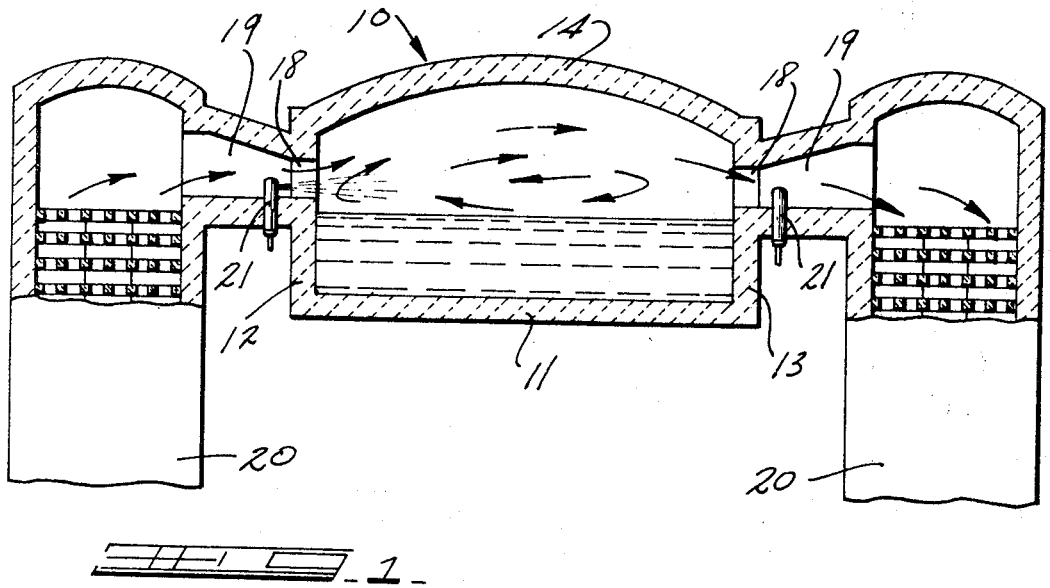
FIG. 1 is an end elevational view, partly in section, illustrating a regenerative glass melting furnace and the relative positioning of the burners in opposed ports.
Figure 2:
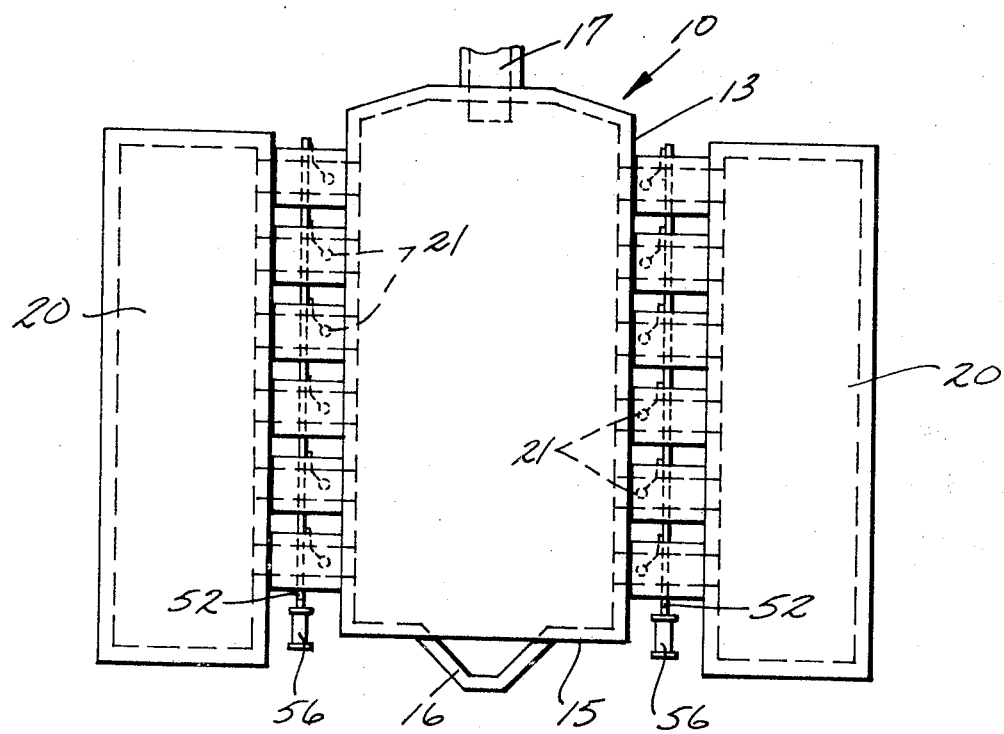
FIG. 2 is a top plan view of the melter of FIG. 1 on a slightly reduced scale.

With particular reference to FIGS. 1–3, the apparatus of the invention will be described.

The glass melting furnace, generally designated 10, is a rectangular chamber formed of a bottom wall 11, side walls 12 and 13, and an overlying crown 14 forming a substantially enclosed melting furnace. An end wall 15, of the usual construction, is provided with a batch loading port or dog-house area 16, with the opposite end of the melter being provided with a submerged outlet channel 17 through which the molten glass is fed to a refiner and forehearth.

Each of the side walls 12 and 13 are provided with a series of ports 18 which open into the interior of the furnace at a level above the metal line or glass level within the melter 10. As is clearly shown in FIG. 2, there are a series of spaced-apart ports along both sides of the melter and each of the ports, as shown in FIGS. 1 and 3, are connected by passageways 19 to the upper end of regenerators 20.

The regenerators 20 take the usual form, it being understood that in the normal regenerative type, reversal furnace, air is introduced through the regenerator on one side, while the combustion gases are removed through the opposite regenerator during one cycle and with the reversal of the furnace a reverse operation is effected.

In each of the passageways 19, adjacent the ports 18, there is provided a burner, generally designated 21.

As shown in FIG. 3, the passageways 19, which connect the burner ports 18 with the regenerators 20, are supported on structural steel elements 22 in the usual manner, with the burners 21 extending through openings 23 formed through the lower wall of the passageways 19.

The particular construction and the mechanism for mounting the burners 21, is shown in detail in FIGS. 4-7. Each of the burners consists of a water jacket assembly, generally designated 24, with a burner tube assembly 25 telescopically mounted within the water jacket assembly. The water jacket assembly is in the form of two cylindrical members 26 and 27, shown as a single unit in FIG. 4 for simplicity, with the two cylindrical members 26 and 27 being closed at the tops and joined together at the base portion 28. In addition to the connection at the base portion 28, a side opening or port 29 is provided and the two cylindrical members 26 and 27 are joined to each other in surrounding relationship to this opening 29 so as to provide a double-walled cooling water chamber 30 which surrounds the inner cylindrical member 27.

Cooling fluid which may take the form of water may be introduced to the chamber 30 through an inlet pipe 31 connected to the base portion 28. Water or other cooling fluid is continuously pumped into the chamber 30 and after substantially completely filling the chamber, will overflow into the upper end of a vertical stand pipe 32, whose upper end is located within a circular depression 33 formed in the underside of the top of the cylindrical member 26. In this manner the chamber will be maintained full of cooling fluid and the fluid, by reason of its circulation through the chamber, will withdraw heat from the chamber surrounding the burner tube assembly 25.

The water jacket assembly 24 is provided with a surrounding insulation 34 which may be in the form of a fire-resistant ceramic, as shown, or could advantageously take the form of an asbestos wrap.

The burner tube assembly 25 takes the form of a generally elongated burner tube 35 having a fuel passage 36 extending axially therethrough to a point adjacent its upper end. Adjacent this upper end there is provided a 90° direction change in the fuel passage 36 so that the passage extends radially of the longitudinal axis of the burner tube 35.

An annular recess 37 surrounds the radially directed terminus of the fuel passage 36, with the end of the passage 36 being provided with internal threads to receive an externally threaded spray nozzle 38. The recess 37 permits access to the recessed nozzle 38 so that it may be installed and replaced when necessary. Also, the recess 37 assures that the outer end of the spray nozzle will not extend radially beyond the radius of the burner tube 35. This is important, as will later be apparent from the description with respect to rotation of the burner tube relative to the water jacket assembly.

The inner cylindrical member 27, as shown in FIG. 4, has a cylindrical portion 39 thereof which extends below the base portion 28 and in turn is provided at its lower end with a radially extending flange portion 40. The flange portion 40 may be conveniently bolted to a slotted angle bracket 41 which in turn is fastened to an angle bracket 42. The angle bracket 42 is welded, or by other means fixed, to the main supporting steel structural member 22. The horizontal slot formed in the angle bracket 41 permits mounting of the burner assembly within the opening 23 formed in the bottom of the passageways 19, with the slot permitting sufficient adjustability to ensure the proper positioning and mounting of the burner assembly through the opening 23.

A two-piece keeper 43 is bolted to the underside of the flange portion 40 and, in cooperation with a collar 44 fixed to the burner tube 35, serves to loosely support the burner tube within the inner cylindrical member 27.

At the lower end of the inner cylindrical member 27 in the portion 39 thereof, there is provided a side opening tube portion 45 to which is connected a flexible air line 46. Air under pressure is fed through the flexible line 46 to the interior of the cylindrical member 27 at a pressure slightly greater than the pressure surrounding the burner assembly so as to prevent the intrusion of contaminants through the burner opening 29 when the particular burner is not in operation. For convenience, this pressure may be maintained constantly so that there will be a slight amount of air flow out through the burner port 29 at all times. Thus it can be seen that at least a pressure balance is maintained across the port 29, or at most a slight pressure differential is maintained.

Oil under pressure between 300 and 500 p.s.i. is fed to the passageway 36 formed in the burner tube 35 through a connector 47 and inlet tube 48. The connector 47 carries a radially extending crank arm 49. The outer end of the arm 49 is pivotally connected to one end of an intermediate link 50, with the opposite end of the link 50 being pivotally connected to a pivot block 51. The pivot block 51 is clamped to an elongated operating bar 52 by a clamp plate 53.

The operating bar 52, as best shown in FIG. 5, has one end coupled by a coupling means 54 to the output shaft 55 of a hydraulic motor 56. Operation of the motor 56, as will be readily appreciated, will effect reciprocation of the output shaft 55 and in turn cause reciprocation of the operating bar 52. Movement of the operating bar 52 will effect rotation of the burner tube 35 through the interconnections of the pivot block 51, intermediate link 50 and arm 49 fixed to the burner tube 35.

The dotted line position of the pivot block 51 in FIG. 5, illustrates one position of the pivot block after operation of the motor 56, with the full line position illustrating the other position that the pivot block 51 will assume.

When the burner tube is in firing position, its spray nozzle 38 will be in alignment with the axis of the burner port 29, as shown in FIG. 6. The spray nozzle 38 is commercially available and provides a substantially flat, fan-shaped spray pattern of atomized oil. The included angle of the spray pattern is about 50° in the horizontal plane and about 10° in the vertical plane.

Upon rotation of the burner tube by the operation of the motor 56, the spray nozzle 38 will be moved to the position illustrated specifically in FIG. 7, wherein the nozzle is protected from contamination and is shielded by its positioning in close proximity to the inner surface of the inner cylindrical member 27.

With a brief reference to FIG. 2, it can be seen that all of the burners along one side of the melter 10 will be positioned in unison by the operation of the motor 56, since the operating bar 52 is connected to all of the burners at one side of the furnace. It should be pointed out that the motors 56 will be operated alternately in synchronism with the normal furnace reversal cycle.

With particular reference to FIGS. 9 and 10, which illustrate a second embodiment of the invention, it can be seen that substantially the same burner structure is present and the same reference numerals are applied to these figures as were applied to the previous embodiment for like parts.

The second embodiment differs from the first described embodiment in the manner in which the burner tube assembly 25 is shifted relative to the burner housing or jacket assembly 24. In this embodiment the lower end of the tube 35 is connected to a coupling member 70. The coupling member 70 is provided with a horizontally extending arm 71 which is adapted to ride within a vertical groove formed in the face of a plate 72. This arrangement assures alignment of the nozzle 38 with the window or port 29. The plate 72 is fixed to a support plate 73 bolted to the vertical portion of the angle bracket 42. The plate 73 also serves as the mounting support for a fluid motor 74. The motor 74 has its output shaft 75 fastened to the coupling member 70. In this embodiment each of the burners has a motor, individual thereto for reciprocating the burner tube assembly 25. The oil infeed line 48 is connected to the tube 35 through a side opening formed in the coupling member 70.

With the particular arrangement described, the burner tube assembly 25 is periodically shifted from the firing position illustrated in FIG. 9 to the non-firing position illustrated in FIG. 10 where the nozzle 38 is shielded from contamination by reason of the fact that its face is substantially covered by the inside of the cylindrical member 27.

While the mechanical details have been described with respect to two embodiments, it should be kept in mind that the rotation of the burner tube assemblies of FIGS. 4–7 may be accomplished by providing a plurality of individual motors which operate the crank arms 49 rather than using a single motor and mechanical linkage for all the burners on each side of the furnace.

The foregoing description sets forth in detail the mechanical arrangement of the burners and sets forth the mechanical system for shifting the burner tubes into and out of firing position.

With reference to FIG. 8, the mode of operation of the burners will be described.

A supply of oil under pressure is connected to a distributing pipe 57. A plurality of branch pipes 58 are connected to the distributing pipe 57 with a branch pipe being connected to the inlet tube 48 of each of the burners. Each of the branch pipes is provided with a shut-off valve 59. It should be understood that each of the valves 59 is opened or closed under normal operating conditions by automatic means which will synchronously open all of the valves on one side of the furnace, while closing the valves connecting the oil supply to the opposite side of the furnace.

A two-way valve 60 has an air supply inlet 61 connected thereto with an air distributing pipe 62 leading from the valve 60 and extending along the length of one side of the furnace. The pipe 62 is provided with a plurality of branch pipes 63, with the branch pipes being connected to the oil inlet tube 48 of each of the burners. The branch pipes are provided with check valves 64 which permit flow of air from the valve 60 to the inlet pipes 48 when valve 60 is positioned as shown in full line in FIG. 8. It should be understood that at this time the oil shut-off valves 59 are closed while air is being fed through the valve 60 to the burners for purging the burner passages 36 of oil just prior to their being rotated from the position shown in FIG. 6 to the position shown in FIG. 7 or shifted from the position shown in FIG. 9 to the position shown in FIG. 10.

As previously stated, the valve 60 is a two-way valve and when the spool thereof is rotated 90° in the direction of the arrow, the air under pressure entering through the inlet 61 will be connected to a plugged outlet 65. At the same time an atmospheric vent pipe 66 will be connected to the air distributing pipe 62. Rotation of the valve 60 is effected shortly after purging of the burners is accomplished, since it is not desirable that air under any pressure be continuously issuing from those burners which have been purged.

During the next portion of the cycle when the purged burners are to be placed in firing position, the burners will be shifted, as previously indicated, from the position shown in FIGS. 7 and 10 to the position shown in FIGS. 6 and 9 and then the valves 59 will be opened permitting fuel oil under pressure to flow to the burners with the nozzles 38 effectively atomizing the oil into a fine spray. The check valves 64 will prevent the intrusion of any oil into the air system.

Thus it can be seen that with the apparatus of the invention a cycle of operation is carried out in which oil under pressure is fed to all of the burners along one side of a furnace and will provide a combustible spray extending over the molten glass in the furnace, while the burners on the opposite side of the furnace are shifted to shield the burner nozzles from contamination by the products of combustion and those burners which are in shielded position are purged of oil.

In addition, the chamber within which each of the burner tubes is positioned, is provided with a supply of air under pressure which is slightly above the pressure present outside the burners so as to, in effect, balance any tendency of gases or other air laden material from intruding through the burner port 29 into the chamber in which the burner is positioned during all periods of operation and in particular during the "off" period.

Other and further modifications may be resorted to without departing from the spirit and scope of the appended claims.

We claim:

1. The method of operating an oil-fired reversing type glass melter, wherein plural burners formed of a fixed support housing and spray nozzle are positioned at intervals along the opposed side walls of the melter comprising the steps of, feeding oil under pressure to all the burners on one side of the furnace, spraying the oil from the nozzles in atomized form in the direction of the opposed side wall for a predetermined period, thereafter, simultaneously discontinuing the feed of oil to said one side burners, flowing air under pressure through the one side oil burners to purge the burner of oil, rotating the nozzles of the one side oil burners relative to the housing to thereby cover the nozzles, and feeding oil under pressure to all the burners on the other side of the furnace, spraying the oil from the nozzles in atomized form in the direction of the opposed side wall for a predetermined time, then discontinuing the flow of oil to said other side burners and purging the burners with air, rotating the nozzles relative to the housing of the burners on said other side to thereby cover the nozzles while rotating in order to uncover the nozzles of the burners on the one side and feeding oil to the burners on said one side, whereby the burners are alternately fired from each side of the melter and the burners not being fed with oil are protected from flames and gases issuing from the opposed set of burners.

2. The method of claim 1, further including the step of cooling the burners during both cycles of operation.

3. In a glass melting furnace wherein said furnace includes side walls, an end wall and bottom wall defining a channel in which batch material is melted to form a flowing stream of glass in said furnace, said furnace including regenerator chambers one on each side of the glass channel, a plurality of regularly spaced burner ports located along each side wall of the furnace, the burner ports in one side wall being directly opposite the ports in the opposite side wall, a passageway connecting each port to a regenerator chamber, the improvement comprising a burner mounted in each passageway, each burner comprising a fixed, hollow, cylindrical member closed at its upper end, extending upward through the floor of the passageway, said member having a small diameter opening formed in the side thereof facing in the direction of the burner port, an elongated tubular member extending within said cylindrical member to at least the height of the opening formed in the side of the cylindrical member, a spray nozzle mounted adjacent the upper end of said tubular member in alignment with the side opening in said cylindrical member, means connected to said tubular member for rotating said member to move its nozzle relative to said cylindrical member into and out of alignment with said opening to cover said nozzle means for supplying fluid fuel under pressure and means connecting said supply means to said tubular member.

4. The apparatus of claim 3, wherein said cylindrical member is in the form of a double wall chamber with said tubular member positioned within the inner chamber and further including means for circulating coolant within the chamber formed by said double wall.

5. The apparatus of claim 3, wherein said tubular member is of less diameter than the internal diameter of said cylindrical member, means for providing a source of air under pressure and means connecting said air source means to said cylindrical member, whereby balancing air is applied in surrounding relation to said tubular member.

6. In a glass melting furnace having a plurality of regularly spaced burner ports located along each side wall of the furnace with the burner ports in one side wall being directly opposite the burner ports in the opposite side wall, the improvement comprising a burner mounted in each port, each burner comprising a hollow, stationary cylindrical member closed at its upper end, extending upward through the floor of the port, said member having a small diameter, divergent opening formed in the side thereof facing in the direction of the interior of the furnace, an elongated tubular member extending within said cylindrical member to at least the height of the opening formed in the side of the cylindrical member, a nozzle mounted adjacent the upper end of said tubular member in the same horizontal plane as the side opening in said cylindrical member, means mounting said tubular member for rotation about its longitudinal axis to thereby cover said nozzle, means for supplying a combustible fuel under pressure and means connecting said fuel supply means to said tubular member.

7. The apparatus of claim 6, wherein said cylindrical member is in the form of a double wall chamber with said tubular member positioned within the inner chamber and further including means for supplying a fluid coolant and means for circulating said coolant within the wall of said double wall chamber.

8. A burner in combination within the passageway leading from a regenerator to a burner port in a glass melting furnace comprising a hollow, cylindrical member closed at its upper end, extending upward through the floor of the passageway, said member having a small diameter, divergent opening formed in the side thereof facing in the direction of the burner port, an elongated tubular member extending within said cylindrical member to at least the height of the opening formed in the side of the cylindrical member, a nozzle mounted adjacent the upper end of said tubular member in alignment with the side opening in said cylindrical member, means connected to said tubular member for rotating said member relative to said cylindrical member in the direction of its longitudinal axis to thereby cover said nozzle, means for supplying a combustible fuel under pressure and means connecting said fuel supply means to said tubular member.

9. The burner combination of claim 8, wherein said cylindrical member is formed of two spaced-apart walls with said tubular member positioned within the inner chamber and further including means for circulating coolant between said walls.

10. In a glass melting furnace wherein said furnace includes side walls, an end wall and bottom wall defining a channel in which batch material is melted to form a flowing stream of glass in said furnace, said furnace including regenerator chambers one on each side of the glass channel, a plurality of regularly spaced burner ports located along each side wall of the furnace, the burner ports in one side wall being directly opposite the ports in the opposite side wall, a passageway connecting each port to a regenerator chamber, the improvement comprising a burner mounted in each passageway, each said burners comprising, a fixed, insulated tubular member extending through an opening in each passageway and having a side opening adjacent the upper end thereof and facing toward the interior of said furnace, a burner tube extending axially of said insulated member with its nozzle at the same height as said side opening, means rotatably mounting said burner tube within said insulated member to move the nozzles of said burner tubes into and out of registry with said side opening in order to uncover and to cover, respectively, said nozzle, an elongated member extending along and supported at each side of the furnace, reciprocating means connected to each of said elongated members, a crank arm carried by each burner tube, pivotal link means connecting said crank arms at one side of the furnace to its respective elongated member, whereby all of the burner tubes on one side of the furnace are rotated simultaneously by said motor means.

11. The apparatus of claim 10, further including, means for supplying air under pressure, valve means connecting said air supply means to said burner tubes, whereby said burner tubes are purged of fuel just prior to rotation by said motor.

References Cited

UNITED STATES PATENTS

| | | | |
|---|---|---|---|
| 1,911,902 | 5/1933 | King | 263—15 |
| 2,491,705 | 12/1949 | Bloom | 263—15 |
| 2,994,519 | 8/1961 | Zellers | 65—337 |

S. LEON BASHORE, Primary Examiner

E. R. FREEDMAN, Assistant Examiner

U.S. Cl. X.R.

65—136, 162, 168, 337, 356; 263—15